(12) United States Patent
Dunton et al.

(10) Patent No.: US 6,685,874 B1
(45) Date of Patent: Feb. 3, 2004

(54) METHOD FOR BLOW MOLDING

(75) Inventors: Thomas Paul Dunton, New Lebanon, NY (US); Lisbeth Lynn O'Connell, Chatham, NY (US)

(73) Assignee: General Electric Company, Pittsfield, MA (US)

(*) Notice: Subject to any disclaimer, the term of this patent is extended or adjusted under 35 U.S.C. 154(b) by 0 days.

(21) Appl. No.: 09/552,165

(22) Filed: Apr. 18, 2000

Related U.S. Application Data

(60) Provisional application No. 60/136,590, filed on May 28, 1999.

(51) Int. Cl.[7] .................................. B29C 39/02
(52) U.S. Cl. .................. 264/540; 264/328.17
(58) Field of Search ............... 264/540, 328.17

(56) References Cited

U.S. PATENT DOCUMENTS

| 5,026,512 A | * | 6/1991 | Chang ..................... 264/101 |
| 5,232,773 A |   | 8/1993 | Itoh et al. |
| 5,367,011 A | * | 11/1994 | Walsh ..................... 524/139 |
| 5,496,880 A | * | 3/1996 | Heuseveldt et al. ........ 524/417 |
| 5,779,959 A |   | 7/1998 | Teutsch et al. |

OTHER PUBLICATIONS

Author: Karl H. Bruning Title: "Blow Molding" pp.: 222–224 (3pgs) Publication.: Modern Plastics Date: Oct. 19991.

* cited by examiner

*Primary Examiner*—Suzanne E. McDowell

(57) ABSTRACT

A method for controlling the hang time of a tubular parison formed from a thermoplastic resin is provided with a second higher melting thermoplastic resin as an additive, and blow molding the resulting resin at a temperature below the glass transition temperature (Tg) of the higher melting component. In the case where the lower melting base resin is PBT and the higher melting additive resin is PET, the temperature of molding is below the Tg of the PET additive.

3 Claims, No Drawings

METHOD FOR BLOW MOLDING

This application claims rights of priority from U.S. Provisional Patent Application Ser. No. 60/136,590, filed May 28, 1999.

FIELD OF THE INVENTION

The present invention generally relates to blow-molding processes used to form hollow articles of a blow-moldable resin. More specifically, the present invention relates to processes whereby a polybutylene terephthalate resin is blow-molded to form hollow articles thereof.

BACKGROUND OF THE INVENTION

Crystalline thermoplastic polybutylene terephthalate (PBT) resins have been used extensively as an engineering plastic in various fields owing to their excellent mechanical and electrical properties, as well as their physical and chemical characteristics. PBT resins have typically not been employed as a feedstock for blow-molding operations since the intermediate hollow parison that is formed during the blow-molding process is undesirably "drawn-down" due to the poor melt tension that conventional PBT resin exhibits. Thus, hollow blow-molded articles have typically not been produced from PBT resins. Instead, PBT resins are conventionally thought of as an injection-moldable resin from which hollow injection-molded articles may be produced.

Prior attempts at forming hollow articles of PBT resins by blow-molding techniques have included increasing the molecular weight of the PBT resin so as to obtain a corresponding increase in melt strength (melt tension) and melt viscosity, since greater molecular weight typically results in a greater melt strength for a given resin. However, merely increasing the molecular weight of PBT resin to thereby increase its melt viscosity does not achieve the needed melt strength sufficient to employ PBT resins in blow-molding processes. Furthermore, the addition of inorganic filler materials has also been attempted as a means to increase the melt viscosity and melt strength of PBT resins sufficiently to allow blow-molding of hollow articles. Again, however, simply adding an inorganic filler to PBT resins (even those having an increased molecular weight) does not achieve the necessary melt strength properties necessary to allow the resin to be processed by blow molding techniques. U.S. Pat. No. 5,232,773 to Itoh et al describes blow-moldable PBT resins comprised of a PBT base polymer and an effective amount of between 0.01 to 5 parts by weight (based on 100 parts by weight of the PBT base polymer) of at least one organosilane compound.

PBT resin is desirably improved for blow molding by enhancing the melt tension characteristics.

SUMMARY OF THE INVENTION

PBT resins are desirable for blow-molding processes which typically produce hollow articles. A blow-moldable PBT resins comprises a PBT base polymer and an effective amount of between 0.1 to 20 parts by weight (based on 100 parts by weight of the PBT base polymer) of polyethylene terephthalate (PET). PET is melt-blended with the PBT base polymer prior to blow molding.

The hang time of a tubular parison formed from a thermoplastic resin, for example, PBT, is controlled by providing a second higher melting thermoplastic resin, for example, PET, as an additive and blow molding the resulting resin at a temperature below melt temperature (Tm) of the higher melting component. In the case where the lower melting base resin is PBT and the higher melting additive resin is PET, the temperature of molding is below the Tm of the PET additive.

DETAILED DESCRIPTION OF THE INVENTION

When small quantities of a high melting point semi-crystalline resin are added to polymers, either amorphous or semi crystalline with lower melt temperatures, and subsequent processing is done at temperatures below the high Tm, significant enhancement to the base polymers's melt strength is achieved. Improved processing in processes such as blow molding, thermoforming and profile extrusion can be achieved where resin melt strength (resistance to sag) is important.

An example, the addition of small quantities of PET resin to PBT resin or PBT blends increases resistance to sag. By processing the resulting material above the PBT Tm but below the Tm of PET significant improvements in melt strength are observed and the material flow is adequate for the application. Other high Tm resins such as nylon 6,6, PPS etc., which are high melting semicrystalline materials, can be added to either amorphous or semicrystalline resins to get the desired effect.

The presence of the high melting point crystals is desirable. If the Tm of the high melting point material is exceeded during processing, the melt strength is lost. To date these materials have been utilized in profile extrusion and extrusion blow molding with excellent results. The level of high melting crystalline resin is dependent on the process being targeted and the specific resins being used. It is desirable to have a large temperature difference between the high melting point semi-crystalline resin and the low melting resin to provide a wide process temperature window possible.

Improved melt strength in traditionally low melt strength resins greatly expands the types of polymers that can be used in polymer conversion processes requiring improved melt strength. More resins are under experimentation to determine what other desirable combinations can be utilized. This technology potentially has a large impact on the thermoforming, blow molding and profile extrusion communities.

The polybutylene terephthalate base polymers used in the compositions of the present invention include polyesters comprised mainly of recurring butylene terephthalate units. In particular, the preferred base polymers are polyesters obtained by condensing 1,4-butanediol with terephthalic acid or its lower alcohol ester. The polybutylene terephthalate base polymer is not limited strictly to PBT homopolymers, but also includes copolymers mainly comprised of polybutylene terephthalate units. The term "copolymers" as used herein thus refers to polymers obtained by the polycondensation of terephthalic acid or its lower alcohol ester as the main dibasic acid component with 1,4-butanediol as the main glycol component in the presence of 40 molar % or less of an ester-forming monomer. The comonomer components usable herein include dibasic acid components such as isophthalic acid, orthophthalic acid, adipic acid, sebacic acid, succinic acid and oxalic acid as well as their lower alcohol esters; and glycol components such as ordinary alkylene glycols other than 1,4-butanediol, e.g. ethylene glycol, diethylene glycol, propylene glycol, trimethylene glycol, hexamethylene glycol, neopentyl glycol and cyclohexanedimethanol as well as aromatic diols, e.g. bisphenol A and ethylene oxide (2 mol) adduct of bisphenol A.

Hydroxy acids such as hydroxybenzoic acid and hydroxynaphthoic acid and their ester-forming derivatives may also be used as suitable comonomers. Furthermore, comonomers having halogen substituents are also usable and are effective in imparting flame retardancy to the resulting blow-molded articles.

In addition, copolyesters having a branched structure obtained by the polycondensation of a polyfunctional comonomeric compound having three or more reactive groups may also be employed as the PBT base polymer. The polyfunctional compounds usable herein include trimesic acid, trimellitic acid, pyromellitic acid and alcoholic esters thereof as well as glycerol, trimethylolethane, trimethylolpropane and pentaerythritol.

The PBT base polymer that may be used in the present invention is preferably one having an intrinsic viscosity (IV) within the range of 0.7 to 2.0, particularly 1.0 to 1.6. PBT resins having an intrinsic viscosity of less than 0.7 exhibit insufficient melt tension and cannot be blow-molded. On the contrary, an intrinsic viscosity exceeding 2.0 is unfavorable because the fluidity of the resin composition is poor. Furthermore, the extrusion moldability property of PBT resins having an IV of greater than 2.0 is impaired due to overloading of the extruder motor and pressure increases at the die.

The blow-moldable PBT resin compositions and the hollow blow-molded articles produced by such blow-molding processes include PET. The amount of the PET compound to be melt-blended with the PBT base polymer in the compositions is from about 1 to about 15 parts by weight based on the weight of PBT, preferably from about 3 to about 10 parts by weight, per 100 parts by weight of the PBT base polymer. When PET is present in an amount less than 1 part by weight, the intended effect to increase melt tension cannot be obtained. On the other hand, when excess amounts of PET is employed, melt-blending and/or blow-molding abnormally increases the composition's viscosity.

A processing temperature of at least about 5 to about 15 degrees below the melting point of the highest melting thermoplastic component (that is, the temperature at which the last crystalline material melts as the polymer is heated) is desirable. The process temperature should be above the melting point of the lowest melting component. In the case of a PBT/PET blend, PBT, which is a substantially crystalline polymer and has an equilibrium melting point of about 227 degrees C., is the lowest melting component. Therefore, the processing temperature should be above about 227 degrees Centigrade. In the case of PET, after crystallization, the equilibrium melting point is about 256 degrees C., so that the operating range processing should be below about 256 degrees or in the range of about 241 to about 251 degrees C.

Known additives usually incorporated in synthetic resin compositions can be added to the PBT resin compositions of the present invention depending on the desired properties to be attained. Suitable known additives include stabilizers such as antioxidants and ultraviolet absorbers; antistatic agents; flame retardants; colorants such as dyes and pigments, lubricants, releasers, crystallization accelerators and nucleating agents.

The process for blow-molding the PBT compositions of this invention may be practiced using conventional blow-molding apparatus. In this connection, the PBT resin composition is plasticized with an extruder or the like, and is extruded or injected through an annular die to form a tubular intermediate parison. The tubular parison is then clamped between mold parts forming a mold cavity and a pressurized fluid (e.g. air) is injected into the interior of the clamped parison so that it inflates and conforms to the walls of the mold cavity. The PBT composition is then allowed to cool and solidify at which time the mold is parted and the hollow blow-molded article is removed.

During blow-molding, temperatures of the extruder cylinder and the die are each preferably maintained at between about 225 degrees to about 280 degrees C., more preferably between about 230 degrees to about 250 degrees C. The mold temperature is preferably between about 40 degrees to about 120 degrees C., and more preferably between about 60 degrees to about 100 degrees C. Although air is most preferably used as the inflation gas due to economic considerations, nitrogen or any other inert gas may be used, if desired. The pressure of the inflation fluid is preferably between 4 to 10 kg/cm.sup.2.

The present invention makes it possible to blow-mold PBT resin which has traditionally been extremely difficult to blow-mold. As a result, hollow blow-molded articles having stable qualities and shapes may be obtained. The PBT resin compositions of this invention may thus be used for the production of hollow articles having excellent physical properties which are inherent in the PBT base polymer and may be used under severe operating conditions. For example, the blow-molded articles may be used as automotive parts, components for chemical apparatus and tools, vessels and the like whereby chemical and heat resistance properties are required; and containers for food and drinks due to the gas-barrier properties, and odorless qualities of the PBT base polymer.

U.S. Pat. No. 5,779,959 to Coyle and Teustch illustrate a blow molding process and apparatus that may be used with the compositions described. According to the patent, a pair of mating annular members defining a resin inlet on the periphery of the module, a coaxial bore having an inner cylindrical surface, an annular extrusion outlet opening into the cylindrical surface; each of said module or modules have a channel for receiving and distributing polymer extending from the inlet to the outlet and defining a flow path for the polymer to flow from the inlet to the annular extrusion outlet through which the polymer is extruded in annular form. The channel extends symmetrically around the longitudinal axis of the extrusion module or modules in a manner so as to subject all of the polymer flowing from said inlet to said extrusion outlet to substantially the same process conditions along said flow path whereby the polymer is distributed at the annular extrusion outlet with properties which are substantially symmetrical around the axis for all resin distributed through said outlet.

With the parison head, the modules coaxially extend over spaced sections of a tapered stepped mandrels as to extrude their respective layers into a tubular extrusion channel defined between the inner surfaces of the modules and the outer surface of the mandrel. The extrudate exits the above-described die into a container blow mold according to conventional techniques. As illustrated in FIG. 10 of the patent, parison 32 exits into a container blow mold 200. Container blow mold 200 can be a conventional split mold which is divided into halves 200*a* and 200*b* along its longitudinal axis and has a shape selected for the particular container desired. The extruded parison 32 is then processed according to conventional blow molding techniques. See, for example, "Blow Molding", Modern Plastics, October 1991, pp. 222–224. For example, after parison 32 exits into container blow mold 200 halves 200*a* and 200*b* of the mold come together, thereby pinching the bottom of parison 32 to form a seal. The sealed bottom of the parison will become the bottom of the finished container. Shortly after the bottom of the parison is pinched, a conventional cutting blade (not shown) severs the parison from the extrudate exiting the annular die 130. The container blow mold 200 is then removed from under annular die 130 and replaced with another mold 300 to repeat the process described above. This particular process is known as a single-station shuttle process. After the container blow mold is removed from under extrusion head 10, container blow mold 200 is shuttled to calibration station 310. A blow pin 311 is then inserted into container blow mold 200 and parison 32 to inflate the-parison into a container schematically illustrated as 312 in FIG. 10. Container blow mold 200 is not illustrated at calibration station 310 in order to better illustrate container 312. The blown container 312 is then separated from mold 200 and trimmed using standard techniques.

The following non-limiting Examples will further illustrate the present invention.

EXAMPLES

PBT containing PET in an amount of 5 parts per 100 parts by weight of PBT base resin (homopolymer) was melt-blended and extruded to form pellets. The pellets were then molded into a tubular parison with a blow molding machine. The resulting parison exhibited enhanced melt strength.

While there has been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed:

1. A process for blow molding an article comprising (a) plasticizing a thermoplastic resin comprising a first component and a second component wherein said second component has a higher melting temperature than the melting temperature of said first component, (b) injecting said plasticized thermoplastic resin through an annular die at a temperature above the melting temperature of the first component and below the melting temperature of the higher melting second component to form a tubular parison, said first component comprises polybutylene terephthalate having an intrinsic viscosity from about 1.0 to about 1.6 and is formed from condensing 1,4-butanediol with terephthalic acid.

2. The process of claim 1 wherein the second component is polyethylene terephthalate.

3. The process of claim 2 wherein from about 1 to about 15 parts by weight of polyethylene terephthalate based on the weight of polybutylene terephthalate are blended prior to injecting molding.

* * * * *